United States Patent [19]

Fallon

[11] Patent Number: 4,834,593

[45] Date of Patent: May 30, 1989

[54] DEVICE FOR THE DRILLING OF WOODEN PANELS WITH A VIEW TO THEIR ASSEMBLY BY DOWELS

[75] Inventor: Regis Fallon, sur Marne, France

[73] Assignee: La Francaise Metallurgie French Body Corporate, Paris, France

[21] Appl. No.: 94,741

[22] Filed: Sep. 9, 1987

[30] Foreign Application Priority Data

Sep. 11, 1986 [FR] France ................ 86 12711
Feb. 16, 1987 [FR] France ................ 87 01951

[51] Int. Cl.⁴ .............................................. B23B 47/28
[52] U.S. Cl. ............................ 408/115 R; 408/72 R
[58] Field of Search ............ 408/72 R, 115 R, 115 B, 408/103, 97; 33/197, 638, 640, 644, 671

[56] References Cited

U.S. PATENT DOCUMENTS

| 581,811 | 5/1897 | Coyle | 408/115 R |
|---|---|---|---|
| 917,488 | 4/1909 | Roberts | 408/115 R |
| 3,914,871 | 10/1975 | Wolff | 408/115 R |
| 4,492,498 | 1/1985 | Kaufman | 408/115 R |
| 4,522,539 | 6/1985 | Gibbs | 408/115 R |
| 4,583,889 | 4/1986 | Fallon | 408/115 R |
| 4,594,032 | 6/1986 | Warburg | 408/115 R |
| 4,602,898 | 7/1986 | Brown et al. | 408/115 R |

FOREIGN PATENT DOCUMENTS

| 0095339 | 11/1983 | European Pat. Off. . | |
| 0136080 | 4/1985 | European Pat. Off. . | |
| 3020970 | 12/1981 | Fed. Rep. of Germany . | |
| 3502846 | 7/1986 | Fed. Rep. of Germany . | |
| 2289305 | 5/1976 | France . | |
| 2408440 | 9/1978 | France . | |
| 2071537 | 9/1981 | United Kingdom . | |
| 2092488 | 8/1982 | United Kingdom | 408/115 R |

Primary Examiner—Gil Weidenfeld
Assistant Examiner—Daniel W. Howell
Attorney, Agent, or Firm—Staas & Halsey

[57] ABSTRACT

A guidance device for drilling panels having a supporting element capable of being fixed on two panels and of receiving a guidance element provided with drill bushes in two different positions for the drilling of an edge of a first panel and for the drilling of a face of a second panel near one of its edges in its face adjacent to the first panel in order to form an L-shaped assembly secured together by dowels received in the drilled holes. The device also positions drill holes in the panels for forming a T-shaped assembly.

20 Claims, 9 Drawing Sheets

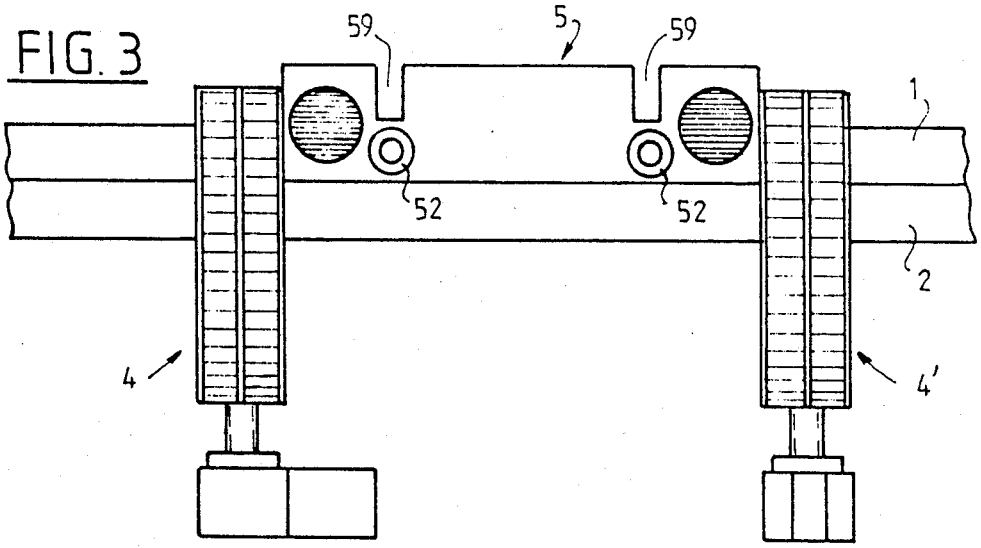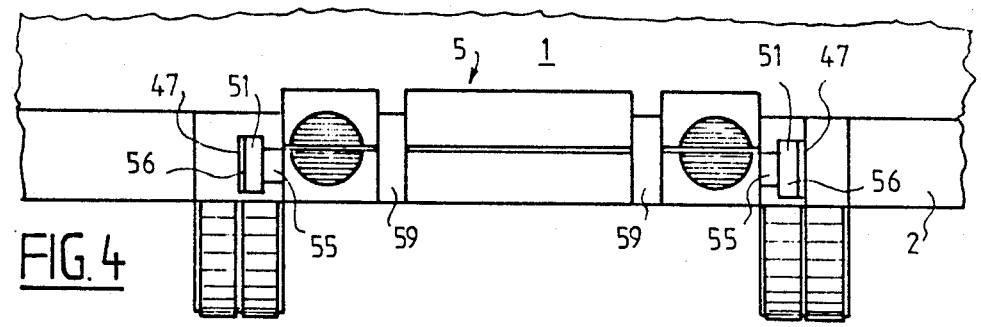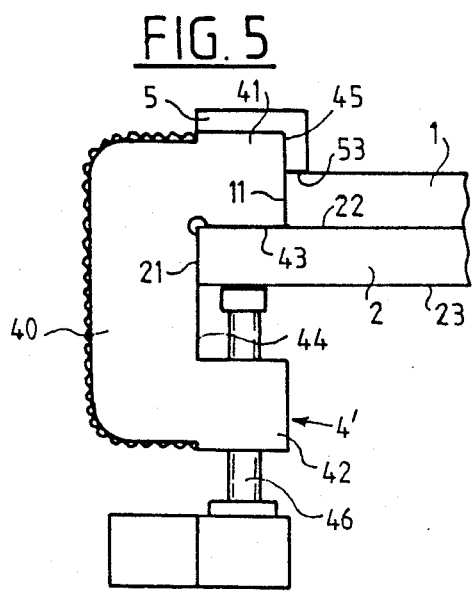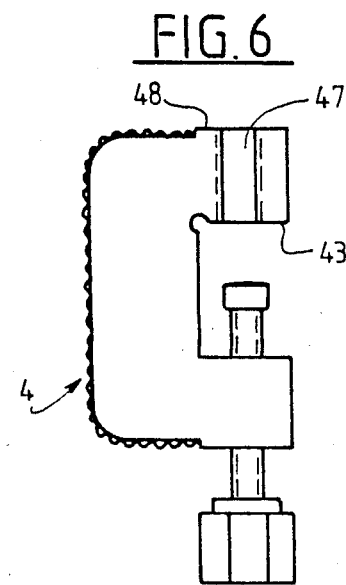

DEVICE FOR THE DRILLING OF WOODEN PANELS WITH A VIEW TO THEIR ASSEMBLY BY DOWELS

BACKGROUND OF THE INVENTION

Field of the Invention

The invention concerns a guidance device for the drilling of wooden or similar panels and to their subsequent assembly by dowels, and in particular, their L-shaped assembly with a flush alignment.

In accordance with a current method for such an assembly, the two panels to be assembled are fixed face-to-face in relation to each other and one sucessively drills one edge of a first panel and one face of the second panel near one of its edges, in an arbitrary order, by means of a guidance device kept fixed to the panels.

Herein, each of the two main sides of a panel is called a "face" and each of the sides joining the main sides is called an "edge".

With most of the known guidance devices, the edge to be drilled of the first panel and the edge next to the drilling zone of the second panel are disposed in the same plane, and the drilling of the second panel is effected in its face on the opposite side to the first panel. This has the result that in order to cause the panels to pass from their drilling position into their assembly position, they must be made to rotate in relation to each other by 270° to bring the drilled face of the second panel opposite the drilled edge of the first panel. This movement has proven difficult to perform in the case of large sized panels or in the case of complex assemblies which include a multiplicity of panels to be fitted to each other.

European Patent No. 0 136 080 discloses a method of the type referred to above wherein the said edges of the two panels are disposed parallel and offset in relation to each other and the said face of the second panel is the one in contact with the first panel, this face being drilled in its zone left uncovered by the edge of the first panel being offset.

After this method has been implemented, a relative rotation of 90° suffices to bring the panels into the assembly position.

SUMMARY OF THE INVENTION

An object of the present invention is to provide an improved guidance device for the implementation of the method described above.

According to the present invention there is provided a guidance device for the drilling of first and second wooden or similar panels and their subsequent assembly by dowels, said guidance device including a supporting element; at least one first guidance element provided with drill bushes therethrough and adapted to be supported by the supporting element with the drill bushes opposite an edge to be drilled of the first panel; and means on said supporting element adapting it to be secured against an edge of the second panel one face whereof is to be drilled at a small determined distance from this edge; said first panel being fixed flat on the said face of the second panel, the said respective edges of the two panels being parallel to each other and offset so as to free the drilling zone of the said face; the device including means mounting the first guidance element for sliding movement relative to the supporting element perpendicular to the faces of the panels so as to adjust its position according to the thickness of the first panel.

Preferably the first guidance element has a flange capable of bearing on the face of the first panel on the opposite side to the second panel so as to position the axes of the drill bushes at a predetermined distance from the said engaged face.

Provision may also be made to position the first guidance element on the supporting element with the drill bushes opposite the face to be drilled of the second panel. It is then advantageous for the flange to bear on the edge of the second panel.

In another embodiment of the invention, provision is made for a second guidance element provided with drill bushes and capable of being supported by the supporting element with the drill bushes opposite the face to be drilled of the second panel.

The device may be arranged so that the second guidance element can be displaced between a working position next to the second panel and a retracted position more remote from the second panel, thus providing access to the drill bushes of the first guidance element when in its retracted position. Alternatively, the axes of the respective drill bushes of the two guidance elements intended to drill the holes having to receive the same dowel can be offset laterally in relation to each other, the second guidance element having at least one cut-out portion to free the access to one drill bush of the first guidance element.

In another embodiment, the supporting element is so configured as to be capable of resting in a stable manner on the said face of the second panel for the drilling of the latter at a distance from its edge, exceeding the said predetermined distance, while bearing against the said edge of the first panel fixed flat on the said face, and has two lateral bearing means which, when the supporting element is so positioned, are adjacent to the said face of the second panel and define bearing planes respectively perpendicular to the edge of the first panel and tangential to the bores of the drill bushes of the guidance element, said guidance element comprising two drill bushes also resting in a stable manner on this face, with the drill bushes facing said face, the distance between the bearing planes being equal to the interaxial distance of the drill bushes decreased by the diameter of their bore.

Conveniently, the two lateral bearing means may be situated on two opposite sides of the supporting element.

Each bearing plane can in particular be defined by a portion of the external surface of the supporting element.

Preferably, the supporting element is capable of bearing on the face of the second panel and on the edge of the first panel by flat external surface portions which are perpendicular to each other.

In the case where the first guidance element has a flange parallel to the axes of the drill bushes for bearing on the face of the first panel on the opposite side to the second panel when the edge of the first panel is being drilled so as to position the axes of the drill bushes at a determined distance from the said face on the opposite side, this first guidance element is preferably received flat on the face of the second panel, the flange being directed in the opposite direction to the second panel for drilling the latter at a distance from its edge.

According to an advantageous characteristic, the supporting element has an edge adapted to contact the face of the second panel in a plane parallel to the edge of the first panel and passing through the axes of the drill bushes of the guidance element.

BRIEF DESCRIPTION OF THE DRAWINGS

FIG. 3 is a side elevational view of a first embodiment of a device according to the present invention, positioned on two panels to be drilled;

FIGS. 4 and 5 are respectively top and side views of the device of FIG. 3;

FIG. 6 is a side view of an element of the device of FIG. 3;

DETAILED DESCRIPTION OF THE PREFERRED EMBODIMENTS

Figure 1:
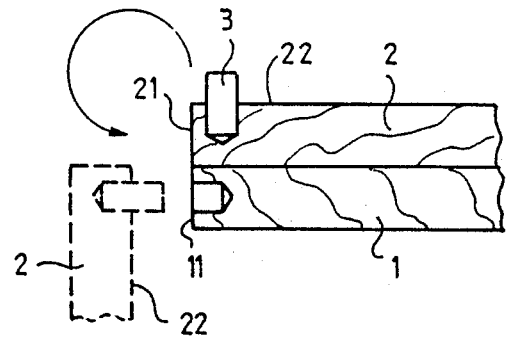
FIG. 1 is a cross-sectional, schematic view showing the relative movement to be effected to bring two panels into the assembly position after they have been drilled using a conventional method.

In FIG. 1, two wooden panels 1 and 2, are represented in solid lines in the relative positions they occupy after drilling with the conventional method described previously. The two panels are disposed face-to-face, their respective edges 11 and 21 being coplanar. The holes are drilled in the edge of panel 1 and in the face 22 of the panel 2 on the opposite side of the panel 1 near the edge 21. An assembly dowel 3 inserted into a hole of the panel 2 has also been represented.

As indicated by the arrow, it is necessary to cause the panel 2 to be rotated by 270°, assuming that the panel 1 remains fixed, to bring it into the position indicated by the broken lines so as to enable the two panels to be assembled by inserting the dowel 3 into the holes of the panel 1.

Figure 2:
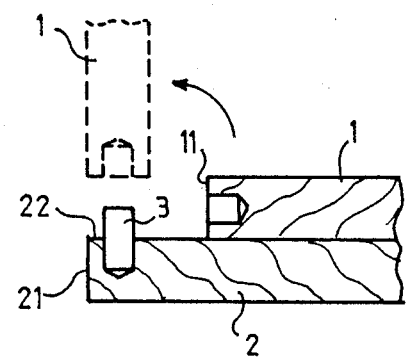
FIG. 2 is a view similar to FIG. 1, relating to the method implemented by the device according to the present invention.

On the other hand, as shown in FIG. 2, after drilling by means of the device according to the invention, the drilled face 22 of the panel 2 is in contact with the panel 1 and a relative movement of one quarter of one turn is sufficient to bring, for example, the panel 1 into the position represented by the broken lines, to enable the two panels to be assembled.

It goes without saying that the dowels can be inserted equally well into the panel 1 drilled on its edge, or in the panel 2 drilled on its face prior to assembly.

The drilling guidance device represented in FIGS. 3 to 5 includes two supporting elements 4 and 4' and a guidance element 5. The supporting elements are of the screw clamp type and each comprise a C-shaped body having a back 40 and two arms 41 and 42. The internal face 43 of the arm 41 bears on the face 22 to be drilled of the panel 2, while the internal face 44 of the back 40, which is perpendicular to the face 43, bears on the edge 21 of the panel 2. As for the edge 11 of the panel 1, it bears on the end face 45 of the arm 41. A threaded rod 46 with its axis perpendicular to the faces of the panels 1 and 2 and cooperating with a threaded hole of the arm 42, bears up against the face 23 of the panel 2 on the opposite side to the panel 1, to hold the supporting element 4 or 4' in the position which has just been defined.

Each supporting element 4 or 4' has a seating groove 47 provided in the arm 41 and opening outwardly along its length in that face of the arm 41 which faces the other supporting element. The grooves 47 are orientated perpendicular to the faces of the panels and their ends open to the internal face 43 and to the face 48 on the opposite side of the arm 41.

The grooves 47 are intended to cooperate with lugs 51 of the guidance element 5 to ensure the angular and longitudinal positioning of the latter and to allow it to slide in the direction perpendicular to the faces of the panels. The guidance element 5 is an elongate component in the longitudinal direction of the edges 11 and 21 of the panels and at the two ends whereof, there respectively project the two lugs 51.

Figure 7:
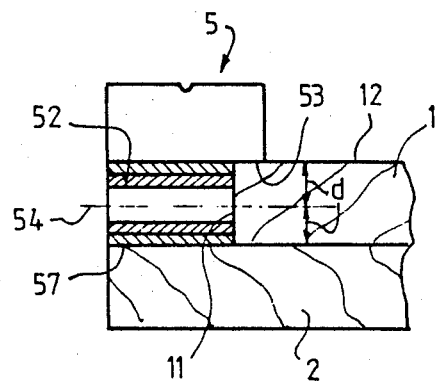
FIGS. 7 and 8 are diagrammatic cross-sectional views showing the different working positions of the guidance element of the present invention used for drilling two panels.
Figure 8:
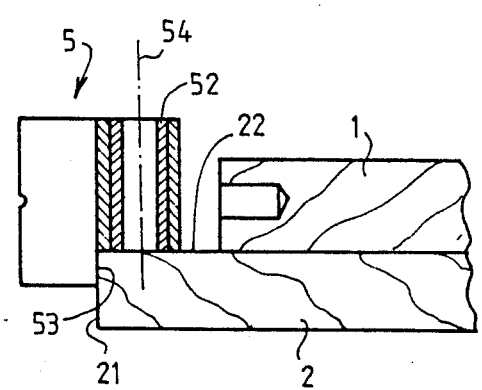

The guidance element 5 is provided with two drill bushes 52 whose bores pass through it perpendicular to its length. The component 5 has in its transverse cross-section, as is seen in FIGS. 7 and 8, a set back or shoulder defining a flange 53 parallel to the axes 54 of the drill bushes.

Each lug 51 is formed by a shank 55 and an end portion 56 with a larger transverse cross-section than that of the shank, this transverse cross-section of the portion 56 being square. The groove 47 of the supporting elements have a profile conjugate with that of the lugs 51 so that the lugs can only be engaged in the grooves when two sides of the square of the end portion 56 of one lug are parallel to the direction of the groove 47. In these conditions, the only possible movement of the guidance element in relation to the supporting elements is a sliding movement in the direction of the grooves 47.

The cooperation of the lugs 51 and of the grooves 47 also defines the distance between the supporting elements 4 and 4'.

It follows from the preceding considerations that the guidance element 5 can be positioned on the supporting elements 4 and 4' in two orientations in which the axes 54 of the drill bushes are respectively perpendicular to the edges 11 and 21 and to the faces of the panels. In the first case, as may be seen in FIG. 7, the drill bushes are opposite the edge 11 to be drilled of the panel 1, flange 53 coming to bear on the face 12 of the panel 1 which is on the opposite side to the panel 2. This position allows holes to be drilled in the edge 11 of the panel 1 whose axes are at a predetermined distance d from the face 12, equal to the distance separating the axes of the drill bushes from the plane of the flange 53. It is this position which is also illustrated in FIGS. 3 and 5. In the second position, the ends of the drill bushes are opposite the face 22 to be drilled of the panel 2, the flange 53 being in contact with the edge 21 of this same panel. Holes can thus be drilled in the face 22 at distance d from the edge 21. The coincidence of the plane of the flange 53 and of the plane of the edge 21, as well as the plane of the face 44 of the supporting elements, results from the dimensions of the guidance element 5 and the position of the grooves 47. After assembly of the panels by means of dowels, the face 12 and the edge 21 will be situated in the same plane.

As may be seen in FIG. 7, the face 57 of the guidance element 5 which is turned towards the panel 2 in the position of drilling the panel 1 is also at the distance d from the axes 54 of the drill bushes. When, as in the example represented, the thickness of the panel 1 is equal to 2d, the face 57 then comes into contact with the face 22 of the panel 2 and the panel 1 is drilled at half its thickness. It is also possible to drill panels with a thickness exceeding 2d, the guidance element 5 then coming into contact only with the panel 1 at the flange 53. The face 57 remains at a distance from the panel 2. In this case, the panel 1 is drilled in an offset manner in relation to its thickness without the flush alignment of the panels after assembly being affected thereby.

It is possible to make provision for different dimensional guidance elements 5 to be usable on the same supporting elements 4 and 4', the different guidance elements being intended to drill panels in various thickness ranges and therefore have different distances d and possibly drill bushes having different internal diameters and/or interaxial distances.

In order to be drilled by means of the device described, the two panels must be fixed in relation to each other, face-to-face with the edge 11 parallel to the edge 21 and set back in relation to the latter. The device may be used to obtain the relative positioning of two panels, for example, by fixing the two supporting 4 and 4' elements on the panel 2 with their faces 44 bearing on the edge 21, and then bringing the edge 11 of the panel 1 to bear on the faces 45 of the supporting elements. After the relative fixing of the panels by appropriate means, the device can be dismantled and successively reassembled at different points to obtain the desired drilling along the panel edges.

Figure 8A:
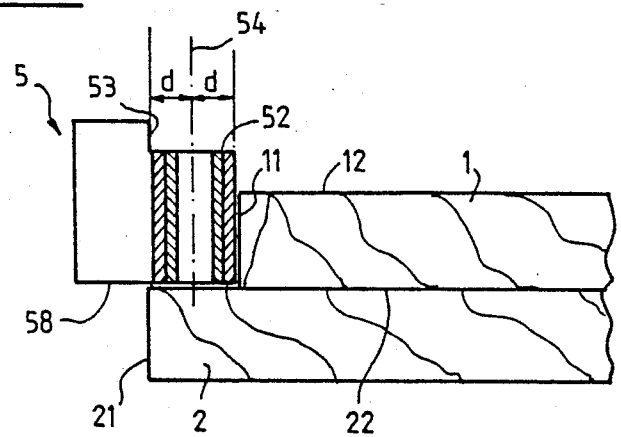
FIGS. 8A is a view similar to FIG. 8 showing a variation in use of the device of FIG. 3.

Passing from the position represented in FIG. 7 to that represented in FIG. 8 requires the element 5 to be turned over end-to-end, the lug 51 which was engaged in the groove 47 of the element 4 coming into that of the element 4' and vice versa; however, it is also possible, after the panel 1 has been drilled, to raise the element 5 to release it from the grooves 47 to cause it to rotate by one quarter of one turn around the axis of the lugs and to re-engage it in the grooves 47 so as to bring it into the position represented in the FIG. 8A. The locations of the axes of the drill bushes 52 are the same in the position of the FIG. 8A and in that of FIG. 8, the cooperation of the lugs 51 and of the grooves 47 ensuring that the distance between these axes and the edge 21 remains equal to d.

The movement of the element 5 may be simplified still further by giving the transfer cross-section of the lugs 51 a circular shape with a diameter equal to the width of the grooves 47. The element 5 can then rotate from the position of FIG. 7 to that of FIG. 8A without it being necessary to remove the lugs from the grooves and to reinsert them therein. In this case, the perpendicularity of the axes 54 in relation to the edge 11 of the panel 1 in the drilling position of this latter, is ensured by the bearing of the flat flange 53 on the face 12. The perpendicularity of the axes 54 in relation to the face 22 of the panel 2 in the drilling position of this latter is ensured by the bearing on this face of the face 58 of the element 5, perpendicular to the axes 54 and not adjacent to the flange 53.

The device illustrated also allows the panels to be drilled with a view to their assembly in a T configuration. The element 5 has, for this purpose, two transverse grooves 59 arranged in one of its longitudinal faces parallel to the axes 54 of the drill bushes and whose dimension in the longitudinal direction of the element 5, that is to say, in the direction of their own width, coincides with that of the bores of the drill bushes 52.

Figure 8B:
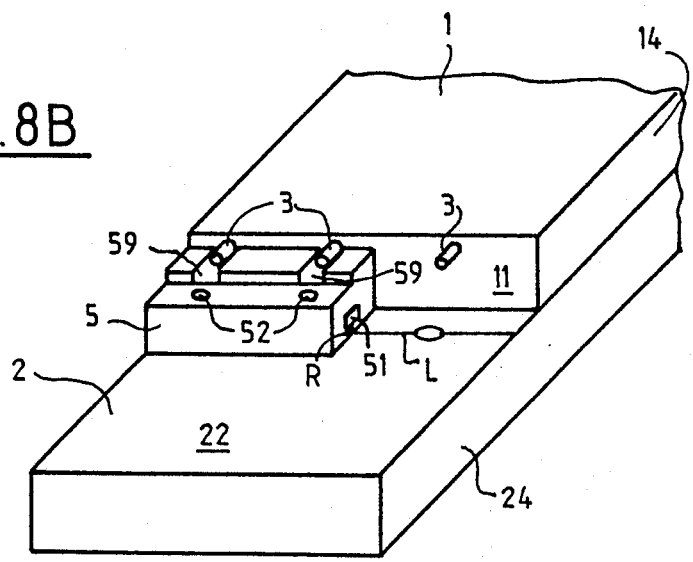
FIG. 8B is a perspective view showing the use of a device used for a T-shaped assembly.

Having drilled the edge 11 of panel 1 as described above, the assembly dowels 3 (FIG. 8B) are introduced into the holes thus made and the guidance element 5 is placed on the face 22 to be drilled of the panel 2 so that the face of the guidance element having the groove 59 bears against the edge 11, the dowels 3 engaging in the grooves 59. The panels 1 and 2 are suitably positioned in relation to each other in the longitudinal direction of the edge 11, for example, in that edge 14 of the panel 1 perpendicular to edge 11 and edge 24 of the panel 2 are coplanar. The assembly formed by the panel 1 and by the guidance element 5 is then slid on the panel 2 in the direction of the axes of the holes of the panel 1 so as to bring a mark R provided at at least one of the ends of the element 5 in the plane of the axes of the drill bushes 52, to coincide with a straight line L, previously drawn on the face 22 of the panel 2 to mark the locations of the holes to be drilled in the latter. The drill bushes 52 are then in the appropriate position for drilling the holes having to receive the dowels 3 engaged in the grooves 59.

Figure 9:
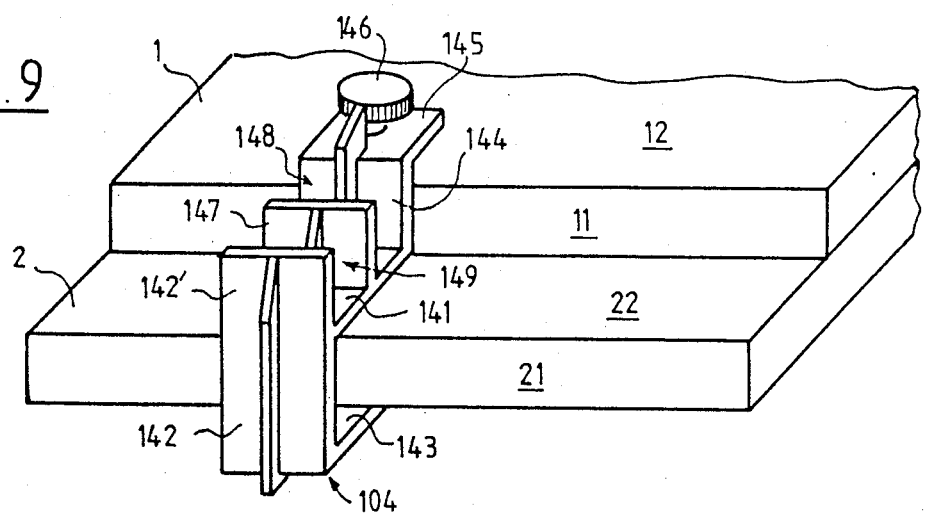
FIG. 9 is a perspective view showing the supporting element of another embodiment of the present invention, mounted on two panels to be drilled.
Figure 10:
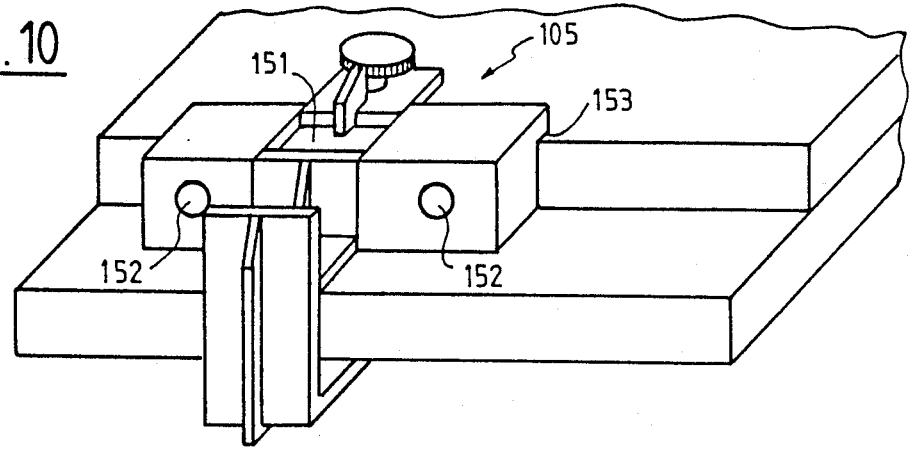
FIGS. 10 and 11 are views similar to FIG. 9, in which a guidance element is placed in alternative positions for separately drilling the two panels.
Figure 11:
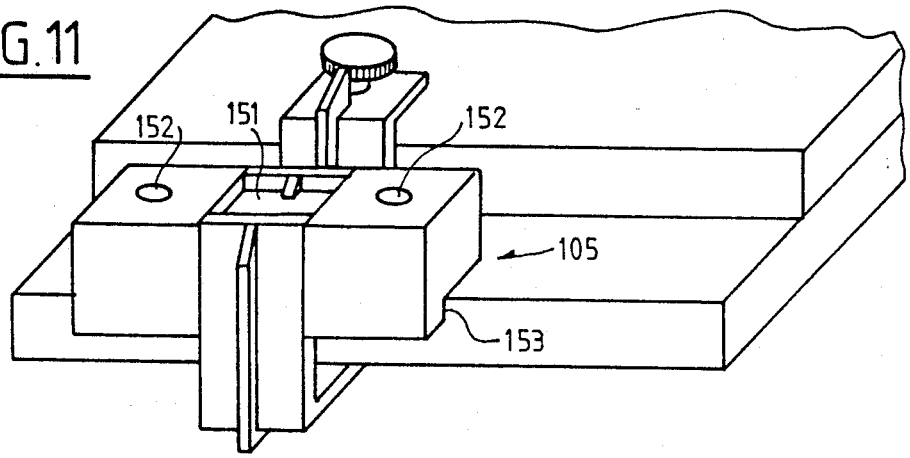

The device illustrated in FIGS. 9 to 11 comprises one single supporting element 104 and one guidance element 105. The supporting element 104 comprises a sole 141 intended to rest on the face to be drilled 22 of the panel 2 and extending between the edge 21 of the latter and the edge 11 of panel 1. The sole 141 constitutes one of the arms of a screw clamp whose back 142 bears on the edge 21 and whose opposite arm 143 extends opposite the face of the panel 2 on the opposite side to the face 22. The arm 143 is traversed by a screw, not visible in the drawings, allowing the panel 2 to be tightened against the sole 141. At the end of the sole 141 remote from the back 142, there is joined a portion 144 of the supporting element 104 which is in contact with the edge 11 of the panel 1 and which has an extension tab 145 extending parallel with the faces of the panels. A tightening screw 146, whose end bears on the face 12 of the panel 1, passes through the tab 145. The supporting element 104 thus determines the relative positions of the panels 1 and 2 without it being necessary to use independent means for this purpose.

The back 142 of the screw clamp is extended beyond the sole 141 by an arm 142' which recedes from the plane of the face 22. An intermediate arm 147 also extends from the sole 141 at a position spaced approximately halfway between the portion 144 and the arm 142'. The supporting element 104 thus forms two compartments, one compartment 148 being defined by a space between the portion 144 and the arm 147, and the other compartment 149 being defined by a space between the arms 147 and 142'. Each one of these compartments can receive the same guidance element 105, similar in its general shape to the guidance element 5 of FIGS. 3 to 5, but in which the lugs 51 have been eliminated and replaced by medial cut-outs 151 capable of cooperating with the sole 141 and the arms 144, 147 and 142' for securing the element 105 against rotation and translation in the longitudinal direction of the edges of the panels, while allowing its insertion and sliding in the direction perpendicular to the faces of the panels. The shapes of the supporting element 104 and of the cut-outs 151 of the guidance element 105 cooperate so as to allow the latter to be placed into two positions. In the first of these positions, illustrated in FIG. 10, the guidance element is engaged in the compartment 148 with the drill bushes 152 opposite the edge 11 of the panel 1, the flange 153 bearing on the face 12 of the latter. In the second position, as illustrated in FIG. 11, the guidance element 105 is received within the compartment 149, the drill bushes 152 being located opposite the face 22 of the panel 2 and the flange 153 bearing on the edge 21 of this latter.

It is clear that the diagrams of FIGS. 7 and 8 and the corresponding explanations also apply to the devices of FIGS. 9 to 11, except that in the position of drilling panel 11, the guidance element 105 is at a distance from the edge 21 of the panel 2. As a result, with the same thickness of the panels and the same distance d, the interspacing of the edges 11 and 21 is greater with the device of FIGS. 9 to 11 than with that of FIGS. 3 to 5.

Figure 12:
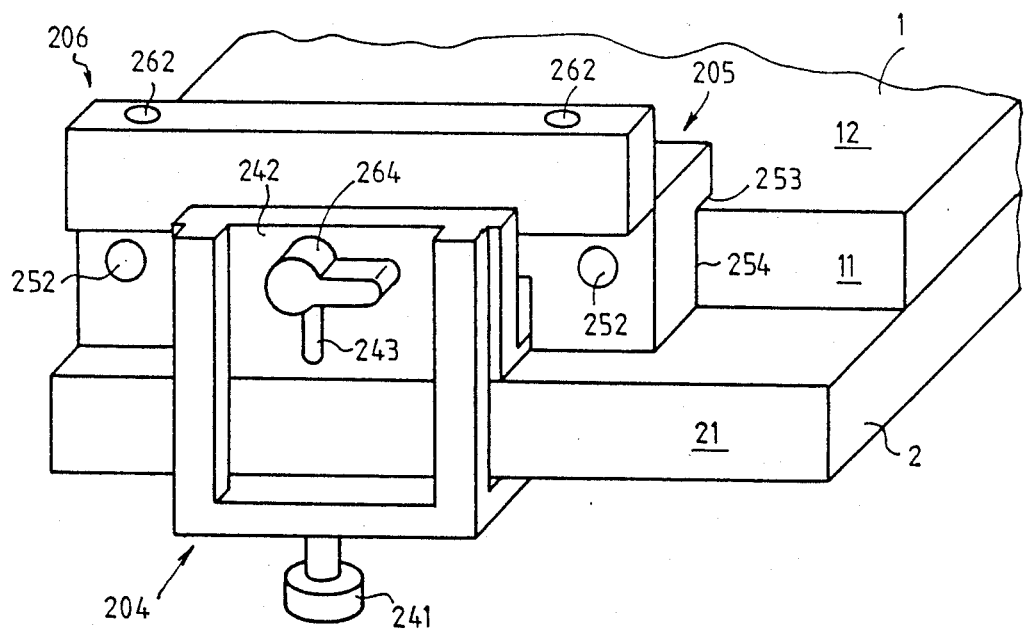
FIG. 12 is a perspective view of another embodiment the present invention, mounted on two panels to be drilled.

The device represented in FIG. 12 comprises a guidance element 206 for drilling the face 22 of the panel 2 in addition to the supporting element 204 and the guidance element 205 for drilling the edge 11 of the panel 1.

Here again, the supporting element 204 forms a screw clamp which can be tightened on the edge of the panel 2, bearing on the face 22 and on the edge 21, by means of a screw 241 situated on the opposite side to the face 22 to be drilled of the panel 2. It has, moreover, a plate 242 extending parallel to the edge 21 of the panel 2 near this edge and away from the face 22. The first guidance element 205 is fixed to the supporting element 204 with scope for sliding perpendicular to the faces of the panels. It has, like the guidance element 5 and 105 described above, two drill bushes 252 intended for drilling the edge 11 of panel 1, and a flange 253 coming to bear on the face 12 of the panel 1 in the position of drilling the latter. The position of the edge 11 in relation to the panel 2 can be defined by its cooperation with a bearing surface 254 adjacent to the flange 253 of the guidance element 205 and/or with a bearing surface (not shown) of the supporting element 204.

The guidance element 206 for drilling panel 2 is also fixed to the supporting element 204 with scope for sliding in the direction perpendicular to the faces of the panels. It slides between a rest position illustrated in FIG. 12, relatively remote from the face 22 of the panel 2 wherein it leaves the drill bushes 252 of the guidance element 205 free and therefore allows the panel 1 to be drilled, and a working position, not illustrated, which is closer to the panel 2 and preferably adjacent to the face 22 of the latter. Panel 2 is then drilled by means of the drill bushes 262 provided in the guidance element 206. In this working position, the guidance element 206 obstructs access to the drill bushes 252; thus, it is necessary to make the element slidable 206. The position of element 206 can be fixed by means of a screw passing through an elongate hole 243 of the plate 242 of the supporting element, and screwing into the element 206 by means of a manually operated head 264 for tightening the plate 242 between the guidance element 206 and the head 264.

The distance between the axes of the drill bushes 262 and the edge 21 of the panel 2 bearing against the back of the screw clamp, is equal to the distance between the axes of the drill bushes 252 and the plane of the flange 253 of the guidance element 205 which here again ensures the assembly of the panels 1 and 2 with a flush alignment.

Figure 13:
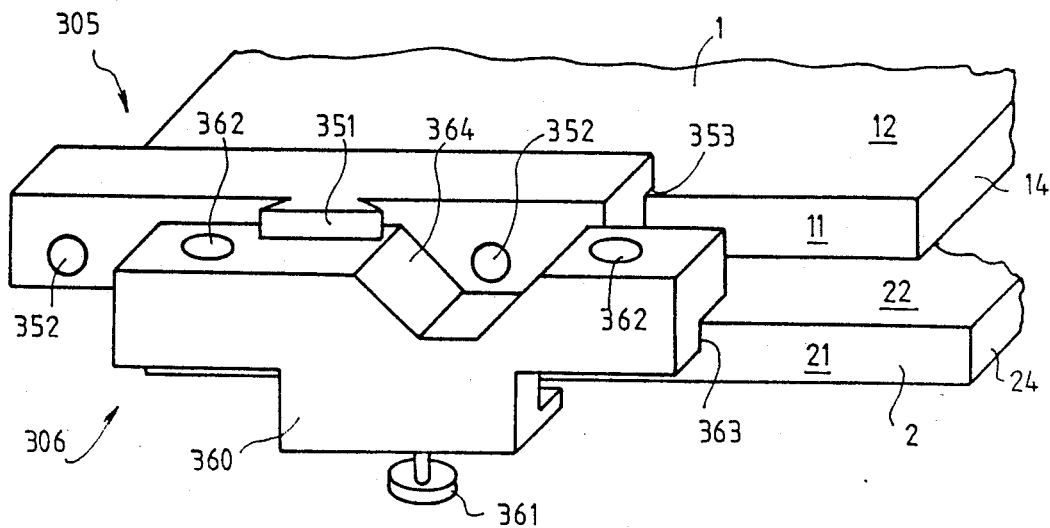
FIG. 13 is a perspective view of another embodiment of the invention.

The device of FIG. 13 also comprises a guidance element 305 intended for the drilling of the edge 11 of the panel 1 and a guidance element 306 intended for the drilling of the face 22 of the panel 2. The guidance element 306 also performs the function of a supporting element and includes a screw clamp having a tightening screw 361. The internal face 363 of the back 360 of the screw clamp bears against the edge 21 of the panel 2. As a variant, the guidance element 306 could be associated in a fixed manner with a separate supporting element, itself fixed on the edge of the panel 2, or be tightened on the edge of the panel 2 by an independent scew clamp. As for the guidance element 305, it is mounted to slide in a direction perpendicular to the faces of the panels, as in the case of the embodiments described above, to adapt itself to various panel thicknesses by the bearing of a flange 353 on the face 12 of the panel 1. The guidance element 306, cooperates with at least one dovetail-type slide 351 which cooperates with a conjugate slide surface of the element 306, or of the supporting element, if any.

By reason of the fixed position of the guidance element 306, the drill bushes 352 of the guidance element 305 and the drill bushes 362 of the guidance element 306 are offset in relation to each other in the direction perpendicular to their axes, that is to say, the longitudinal direction of the edges 11 and 21 of the panels, so that the guidance element 306 should not obstruct access to the drill bushes 352 of the guidance element 305. One of the drill bushes 352 is free because it is beyond the end of the guidance element 306. Moreover, a cut-out 364 is cut in this latter to allow access to the other drill bush 352. Of course, the offset of the drill bushes 352 and 362 is reflected in an offset in the positions of the holes drilled in the panels 1 and 2. When, as is generally the case, at least two edges 14 and 24 of the panels 1 and 2 must respectively be located in the same plane after assembly of the two panels, these two edges must be offset in relation to each other at the time of drilling, by a distance equal to the displacement of the axes of the drill bushes. For this purpose provision may be made for a positioning jig, not shown, forming part of the device, or supplied therewith.

Figure 14:
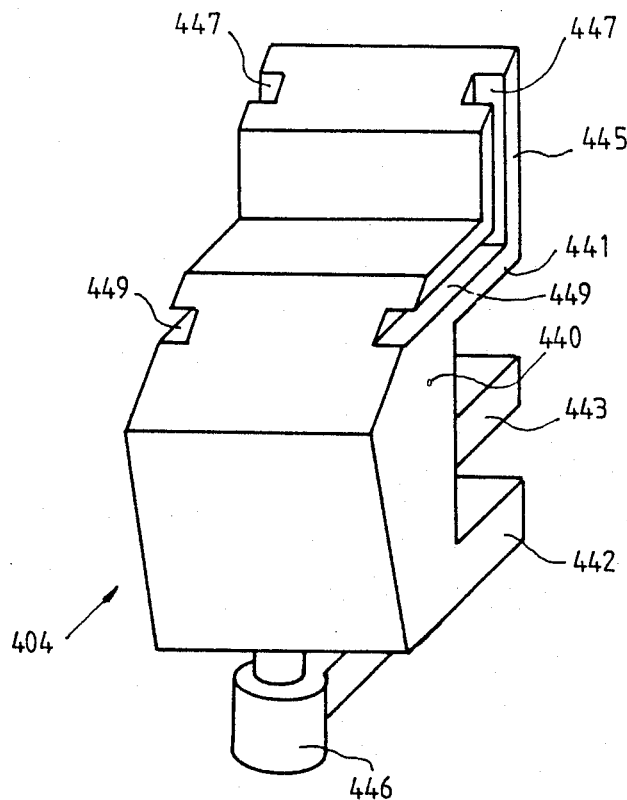
FIGS. 14 and 15 are perspective views of two elements respectively constituting another embodiment of the invention.
Figure 15:
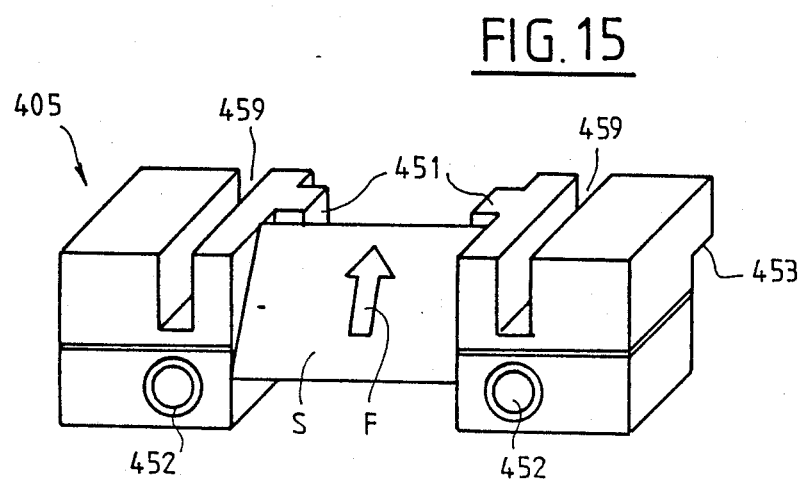

The device shown in FIGS. 14 and 15 consists of a supporting element 404 and a guidance element 405. The supporting element 404 forms a screw clamp with a back 440 intended to come to bear on the edge 21 of the panel 2, one arm 441 coming to bear on the face 22 of this same panel and one arm 442 traversed by a tightening screw 446. The end of screw 446 is held in a plate 443 parallel to the arms 441 and 442, in relation to which it can turn but it cannot be displaced in translation. The plate 443 can, moreover, slide perpendicular to its own plane in relation to the back 440 of the screw clamp. The panel 2 to be drilled can thus be tightened between the arm 441 and the plate 443 which improves the stability of the connection.

The supporting element 404 has an arm 445 joined to, and extending perpendicular to, the arm 441. The edge 11 to be drilled of the panel 1 bears against the arm 442. In the lateral faces of the arms 441 and 445, there are arranged grooves 449 and 447 respectively which extend parallel to the planes of theses arms and therefore perpendiculr to each other. These grooves receive ribs 451 of the guidance element 405. The ribs 451 extend perpendicular to the drill bushes 452 of the element 405. The element 405 also has grooves 459 and a flange 453 similar to the elements 59 and 53 respectively of the element 5 of FIGS. 3 and 4.

The cooperation of the ribs 451 with the grooves 447 and 449 defines two possible positions for the guidance element 405 on the supporting element 404. In the first position, the ribs 451 engage in the grooves 447 until the flange 453 comes to bear on the face 12 of the panel 1. The drill bushes 452 are then orientated perpendicular to the edge 11 of the panel 1 for the drilling of the latter. In the second position, the ribs 451 engage in grooves 449 until the flange 453 comes to bear on the edge 21 of the panel 2. The drill bushes 452 are then oriented perpendicular to the face 22 of this latter for the drilling thereof. An arrow F drawn on an inclined surface S of the guidance element 405 designates that one of the panels which can be drilled in the position occupied by the element.

All the embodiments described above comprise guidance elements provided with two drill bushes. The drilling of more than two holes in each panel necessitates successive dismantling and reassembly of the device on the panels. Of course, it is possible to make provision for devices wherein the drill bushes or elements have an arbitrary number of drill bushes.

The guidance element 105 can be provided with grooves and marks similar to the grooves 59 and to the mark R of the element 5 for the drilling of one face of a panel at a distance from its edges with a view to producing an L-shaped assembly.

Apart from the device comprising, as in FIGS. 3 to 5, two supporting elements, each having a single compartment for a single guidance element and devices comprising as represented in FIGS. 9 to 11, 14 and 15, a single supporting element having two compartments for a single guidance element, the invention also includes devices comprising a single supporting element provided with a single compartment for a single guidance element or two guidance elements, each having two compartments for a single guidance element.

As stated previously, apart from the drilling of the second panel near its edge with a view to the assembly of two panels in an L-shaped configuration, some of the devices described above allow the second panel to be drilled remote from its edge in order to assemble two panels in a T-shaped configuration.

The device of FIGS. 16 to 19 has been designed more particularly for such an application so that it can be positioned more easily and in a more stable manner on the face of the second panel.

Figure 18:
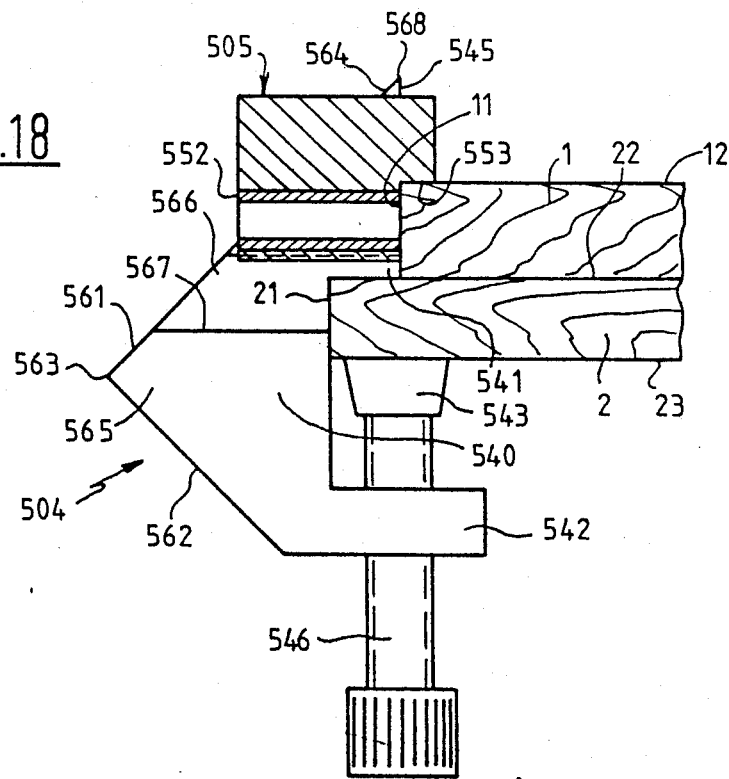
FIG. 18 is a cross-sectional view of the device of FIGS. 16 and 17 in position for drilling the edge of a first one of the two panels.

The device illustrated has a general structure similar to that of the device of FIGS. 14 and 15. It consists of a supporting element 504 and a guidance element 505. The supporting element 504 forms a screw clamp which can be fixed on the edge of a wooden panel 2, as shown in FIG. 18. The screw clamp has a back 540 intended to bear on the edge 21 of the panel 2, an upper arm 541 intended to bear on the upper face 22 of the panel 2 and a lower arm 542 traversed by a tightening screw 546. The internal end of the screw 546 is provided with an end fitting 543 which, during screwing, bears against the lower face 23 of the panel 2.

The supporting element 504 has, moreover, joined to arm 541 and, perpendicular to the latter, an arm 545 which extends away from the arm 542 and against which, as shown in FIG. 18, bears the edge 11 to be drilled of a panel 1 placed flat on the face 22 of the panel 2.

The external face of the back 540 has two flat surface portions 561 and 562 slanting in relation to the tightening direction and perpendicular to each other, defining a right-angled edge 563 parallel to the internal faces of the back 540 and of the arm 541. The end face 564 of the arm 545 is in the same plane as the surface portion 561 of the back.

Figure 16:
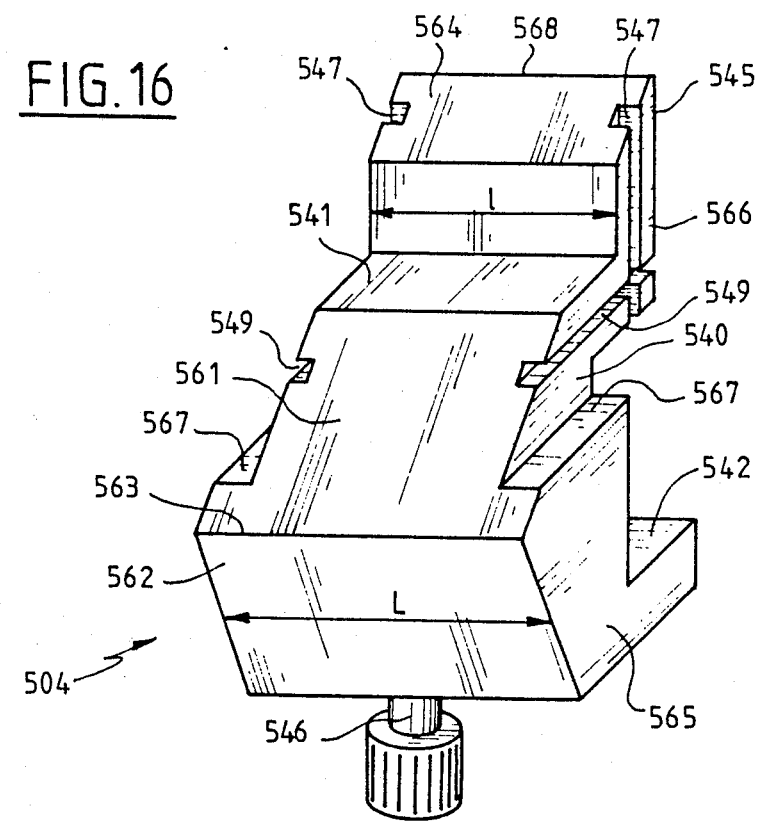
FIGS. 16 and 17 are views in perspective of the supporting element and of the guidance element respectively of another embodiment of the invention.
Figure 17:
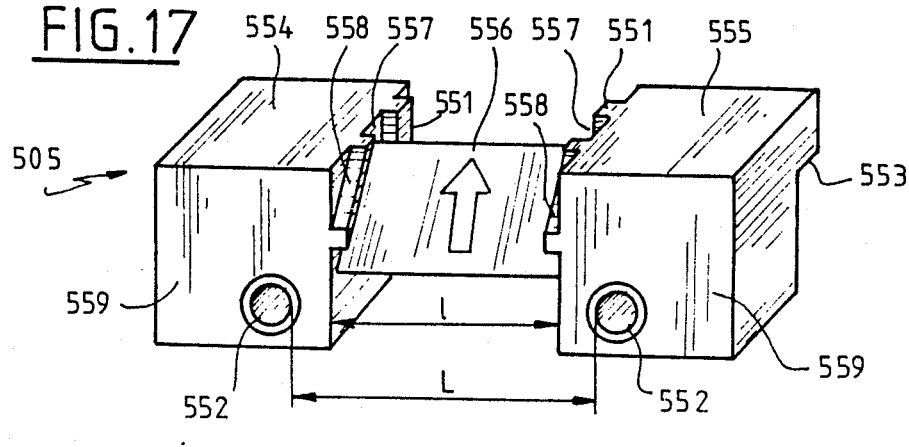
Figure 19:
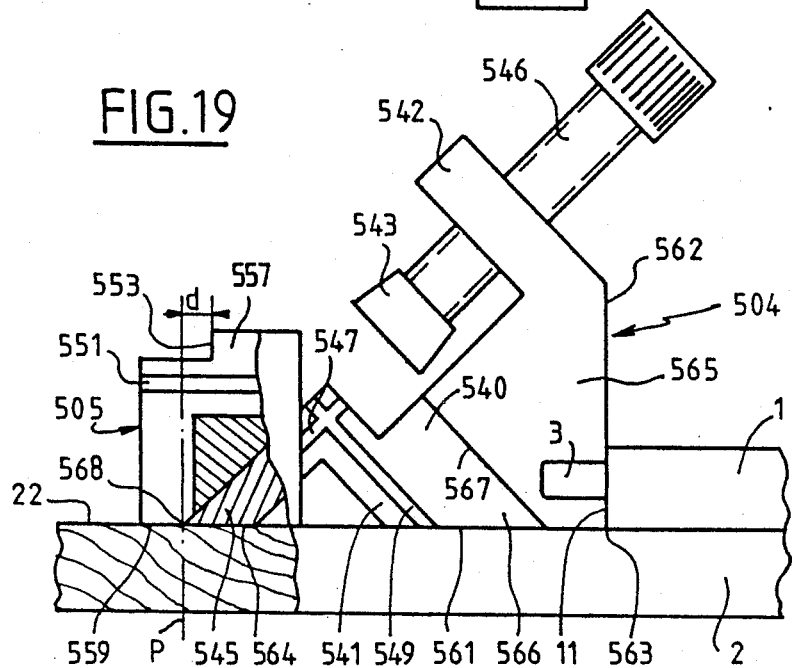
FIG. 19 is a side elevational view, partly in cross-section, of the device of FIGS. 16 and 17, in position for drilling the face of the second panel at a location spaced from the edge of the latter.

The arm 542, and the back 540 over a portion of its height, are laterally delineated by two opposed flat surface portions 565, one of which may be seen in FIGS. 16, 18 and 19, both being perpendicular to the surface portions 561 and 562. Each of them therefore forms with these latter a right-angled thrihedron. Referring to FIG. 16, the arms 541 and 545 and the upper portion of the back 540 are laterally delineated by the opposed surface portions 566 parallel to the portions 565 and defining between them a width 1 which is smaller than the width L defined by the surface portions 565. The surface portions 566 are joined to the surface portions 565 by shoulders 567. In the lateral faces 566 there are provided grooves 547 along the arm 545 and parallel to the direction of the latter, and grooves 549 along the arm 541 and parallel to the latter.

The guidance element 505 (FIG. 17) comprises two blocks 554 and 555 interconnected by a bridge 556, each of the blocks 554 and 555 being traversed by a drill bush 552. The bores of the drill bushes have the same diameter and have their axes parallel to each other. The respective faces 557 facing each other, of the blocks 554 and 555, are flat, parallel to each other and parallel to the axes of the drill bushes, and perpendicular to the plane containing these axes. The faces 557 are interspaced at a distance equal to the width 1 of the supporting element. The interaxial distance of the drill bushes 552 is, moreover, equal to the width L increased by the diameter of the bores, that is to say, that the distance separating the two bores is equal to L.

Each one of the blocks 554 and 555 has projecting from its face 557, a rib 551 extending perpendicular to the axes of the drill bushes and a slanting rib 558, the profile of the ribs 551 and 558 corresponds to that of the grooves 547 and 549 of the supporting element. Finally, each one of the blocks 554 and 555 has, in one of its faces wherein there issues the drill bush, a flange 553 parallel to the plane of the axes of the drill bushes.

To drill the edge 11 of the panel 1, as shown in FIG. 18, the guidance element 505 is placed on the supporting element 504 so that the blocks 554 and 555 are on either side of the arms 541 and 545 of the supporting element, the faces 557 cooperating with the face portions 566, and the ribs 551 engaging in the grooves 547. The flange 553 rests on the upper face 12 of the panel 1, the position of the guidance element in relation to the supporting element thus varying according to the thickness of this panel, thanks to the sliding of the ribs in the grooves. The drill bushes 552 are then positioned opposite the edge 11 of the panel 1 for drilling the latter. To facilitate the guidance of the guidance element 505 on the supporting element 504, provision may be made for one of the faces of the bridge 556 joining the blocks 554 and 555 to cooperate with the rear face of the arm 545.

After the panel 1 has been drilled, the face 22 of the panel 2 can be drilled near its edge 21 by raising the guidance element 505 to release it from the supporting element, turning it over on itself to exchange the position of the blocks 554 and 555, and re-engaging it in a horizontal movement on the supporting element, the ribs 551 this time sliding in the grooves 549. Because one uses the same drill bushes 552, the same interaxial distance is obtained for the drilling of the panel 2 and the drilling of the panel 1. Moreover, the distance between the drilling axes of the panel 1 and the face 12 on the one hand, and the distance between the drilling axes of panel 2 and the edge 21 on the other hand, are both equal to d (FIG. 19) between the flange 553 and the axes of the drill bushes which allows a perfectly clean assembly in an L-shaped configuration.

FIG. 19 shows the position of the device in the case where it is desired to drill the face 22 of the panel 2 at a distance from its edge exceeding d, with a view to obtaining a T-shaped assembly with a panel 1 being drilled in its edge 11. First the panel 1 is drilled by the disposition according to FIG. 18, it being possible to replace the panel 2 in the latter by any flat support, for instance, by a work bench. In FIG. 19, the supporting element 504 rests on the face 22 of the panel 2 by its coplanar surface portions 561 and 564. The guidance element 505 cooperates with the supporting element so that its ribs 558 engage in the grooves 547 and also rest in a stable manner on the face 22 with its face 559 perpendicular to the axes of the drill bushes. The edge 568 of the acute dihedron formed by the surface portion 564 and the upwardly facing face of the arm 545 is then in the plane P of the axes of the drill bushes.

The panel 1, whose holes have received the assembly dowels 3, rests flat on the face 22 of the panel 2, its edge 11 coming to bear on the surface portion 562 of the guidance element 505. The interspacing of two dowels 3 inserted into the holes which have been made in the panel 1 by means of the guidance element 505 allows them to come into positions respectively tangent to the surface portions 565 of the supporting element, these surface portions being adjacent and perpendicular to the surface portions 561 and 562 and therefore to the face 22 and to the edge 11. The axes of the holes which will be drilled in the panel 2 will thus be at the same distances as the holes of the panel 1 in relation to a reference plane parallel to the faces 565.

It is then convenient to make the edge 568 coincide with a pre-drawn line on the face 22 of the panel 2 and according to which the axes of the holes to be drilled must be aligned.

Changes may be effected in this last example without thereby departing from the scope of the invention. In particular, the device may comprise, as described above, a first guidance element 505, intended for the drilling of the edge 11 of the panel 1 and a second guidance element intended for the drilling of the face 22 of the panel 2 near its edge 21. The supporting element and the guidance element or elements can cooperate by means other than ribs and grooves. The flat external faces 565 of the guidance element can be replaced in their function of cooperation with the dowels 3 by projections, for instance by ribs which extend to a position adjacent to the face 22 or close to the latter, in the working position. It is also clear that the bearing of the supporting element against the face 22 and the edge 11 can be obtained by other means than flat surfaces. It is not indispensable to make provision for an edge of the supporting element to come into the plane of the axes of the drill bushes. The alignment of the device in relation to a pre-drawn line can be obtained by other means, for instance by marks made at the ends of the guidance element as described above.

We claim:

1. A guidance device for drilling first and second panels to be assembled by dowels, the first and second panels having faces and edges, the first panel being disposed flat on a face of the second panel, the respective edges of the two panels being parallel to each other and offset, the first panel having an edge to be drilled and the second panel having a face to be drilled, said guidance device comprising:
   a supporting element;
   means carried by the supporting element for permitting the edge of the first panel and the face of the second panel to be drilled, said means including at least one first guidance element having drill bushes extending therethrough and being supported by the supporting element in at least one position in which the drill bushes oppose the edge to be drilled of the first panel;
   means for securing said supporting element against the edge of the second panel, the face to be drilled of the second panel being at a predetermined distance from the edge to be drilled of the first panel; and
   means for mounting the first guidance element for sliding movement relative to the supporting element perpendicular to the faces of the panels.

2. A device according to claim 1, wherein the first guidance element has a flange parallel to the axes of the drill bushes and a surface perpendicular to the falnge, the flange bearing on a face of the first panel remote from the second panel so as to position the axes of the drill bushes at said predetermined distance from the said face of said first panel.

3. A device according to claim 2, wherein the first guidance element is movable relative to the supporting element to a second position where the drill bushes are opposite the face to be drilled of the second panel.

4. A device according to claim 3, wherein said first guidance element is removable and reversible to position the flange to bear on the edge of the second panel when the first guidance element is in the second position for drilling the second panel.

5. A device according to claim 3, wherein the supporting element is provided with a compartment for receiving the first guidance element, said guidance element being recessible in said compartment in the first and second positions for drilling the first and second panels.

6. A device according to claim 3, wherein the supporting element is provided with two compartments for the alternatively receiving the guidance element in the two compartments of the supporting element for the first and second positions for drilling the two panels.

7. A device according to claim 1, including a second guidance element provided with drill bushes and being slidably supported by the supporting element with the drill bushes opposite the face to be drilled of the second panel.

8. A device according to claim 7, wherein the second guidance element is slidable between a working position juxtaposed the second panel and a retracted position remote from the second panel, access being given to the drill bushes of the first guidance element when said second guidance element is in said retracted position.

9. A device according to claim 7, wherein the respective drill bushes of the two guidance elements intended for the drilling of the holes which are to receive the same dowel have axes that are laterally offset in relation to each other, and the second guidance element has at least one cut-out portion to provide access to one drill bush of the first guidance element.

10. A device according to claim 1, wherein the supporting element has surfaces for resting in a stable manner on the face of the second panel for drilling the second panel at a distance spaced from its edge, exceeding the predetermined distance, while bearing against the edge of the first panel fixed flat on the face of the second panel, and has two lateral bearing means which are adjacent to the face of the second panel when drilling the face thereof and define bearing planes respectively perpendicular to the edge of the first panel and tangential to the bores of the drill bushes of the guidance element, said guidance element including two drill bushes also resting in a stable manner on the face of the second panel, with the drill bushes facing said face, the distance between the bearing planes being equal to the interaxial distance of the drill bushes decreased by the diameter of their bores.

11. A device according to claim 10, wherein the two bearing means are situated on two opposite sides of the supporting element.

12. A device according to claim 10, wherein each bearing means bearing plane is defined by an external surface portion of the supporting element.

13. A device according to claim 10, wherein the supporting element surfaces are flat mutually perpendicular external surface portions bearing on the face of the second panel and on the edge of the first panel.

14. A device according to claim 13, wherein each bearing means forms with said perpendicular external surface portions a right-angled trihedron.

15. A device according to claim 2, wherein the supporting element has surfaces for resting in a stable manner on the face of the second panel for drilling the latter at a distance spaced from its edge, exceeding the said predetermined distance, while bearing against the edge of the first panel fixed flat on the face of the second panel, and has two lateral bearing means adjacent to the said face of the second panel when drilling the face thereof and define bearing planes respectively perpendicular to the edge of the first panel and tangential to the bores of the drill bushes of the guidance element, said guidance element including two drill bushes also resting in a stable manner on the face of the second panel, with the drill bushes facing said face, the distance between the bearing planes being equal to the interaxial distance of the drill bushes decreased by the diameter of their bores, and wherein the first guidance element is received flat on the face of the second panel, the flange being directed away from the second panel.

16. A device according to claim 10, wherein the supporting element has an edge movable into contact with the face of the second panel in a plane parallel to the edge of the first panel and passing through the axes of the drill bushes.

17. A guidance device for drilling first and second panels to be assembled by dowels, each of said first and second panels having opposite faces and an edge, the respective edges of the two panels being parallel to each other and offset, the guidance device comprising:
  a supporting element;
  at least one first guidance element having a purality of drill bushes extending therethrough and being movably supported by the supporting element in a first position in which the drill bushes oppose an edge of the first panel for drilling the first panel and a second position in which the drill bushes oppose a face of the second panel for drilling the second panel;
  means for securing the support element against an edge of the second panel; and
  means for slidably mounting the first guidance element for sliding movement relative to the supporting element perpendicular to the faces of the panels.

18. A guidance device according to claim 17, wherein the supporting element comprises a pair of C-shaped clamps, each having two arms, the means for securing the support element being disposed in one of the two arms and the means for mounting the guidance elements being formed in the other of the two arms.

19. A guidance device according to claim 17, wherein the supporting element comprises a clamp having two compartments, each compartment holding the guidance element in one of the first and second positions, the means for mounting the guidance elements comprising complementary surfaces of the compartments and the guidance element.

20. A guidance device for drilling first and second panels to be assembled by dowels, each of said first and second panels having opposite faces and an edge, the respective edges of the two panels being parallel to each other and offset, the guidance device comprising:
  a supporting element;
  a first guidance element carried by the supporting element and having a plurality of drill bushes extending therethrough and being disposed in a position in which the drill bushes oppose an edge of the first panel for drilling the first panel;
  a second guidance element slidably mounted on the supporting element and having a plurality of drill bushes extending therethrough, the axes of which are perpendicular in relation to the axes of the drill bushes of the first guidance element, and being movably supported by the supporting element in a position in which its drill bushes oppose a face of the second panel for drilling the second panel; and
  means for securing the support element against an edge of the second panel.

* * * * *